Sept. 2, 1969    H. H. ENGLAND    3,464,137
ICE AUGER HOLE VISUAL FISHING AID
Filed April 20, 1967    2 Sheets-Sheet 1
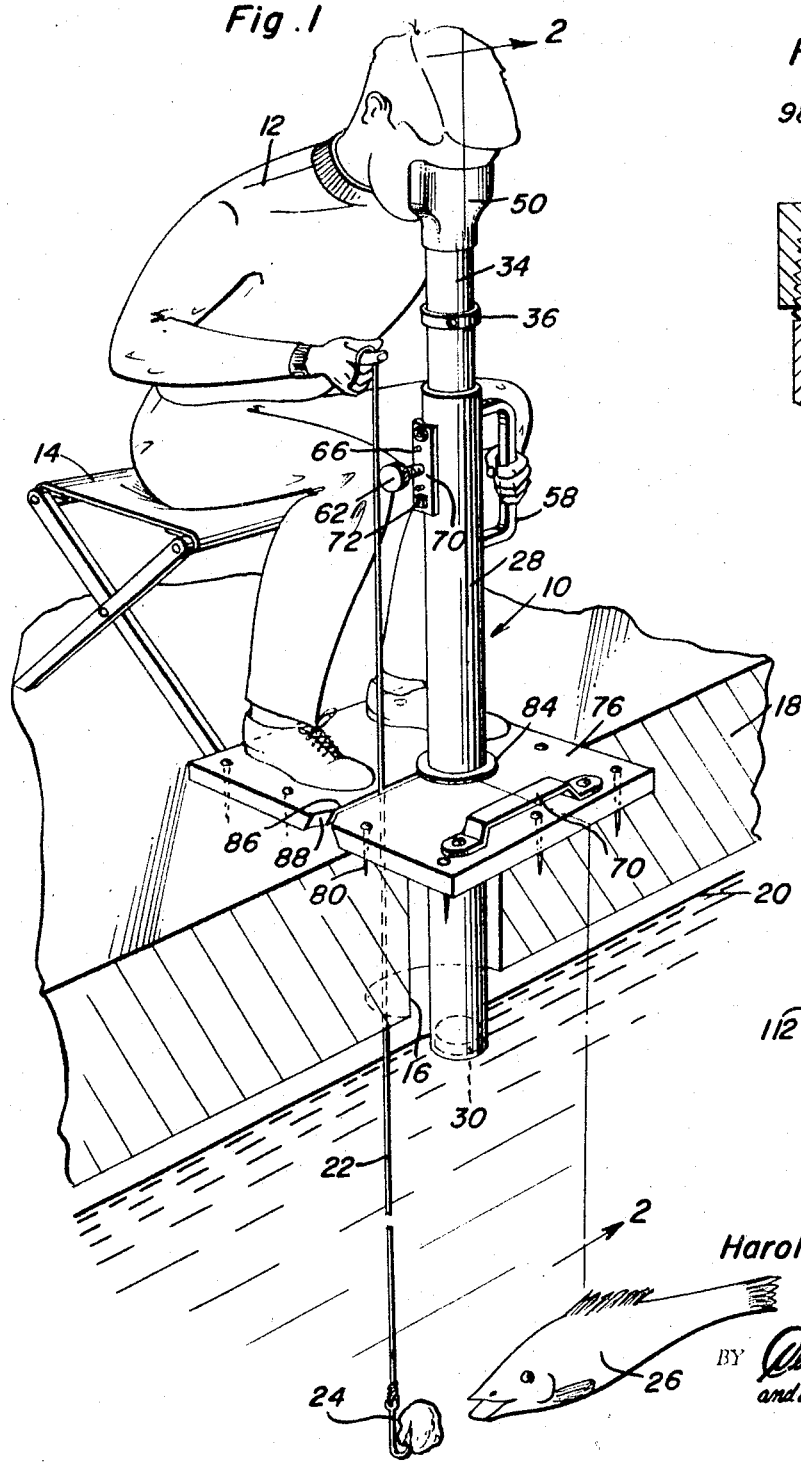
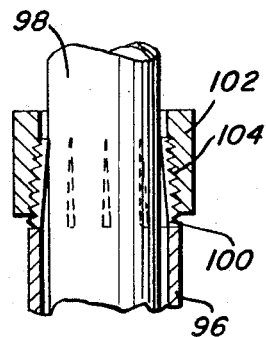
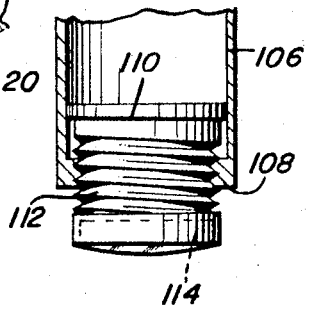
Harold H. England
INVENTOR.

Sept. 2, 1969  H. H. ENGLAND  3,464,137
ICE AUGER HOLE VISUAL FISHING AID
Filed April 20, 1967  2 Sheets-Sheet 2
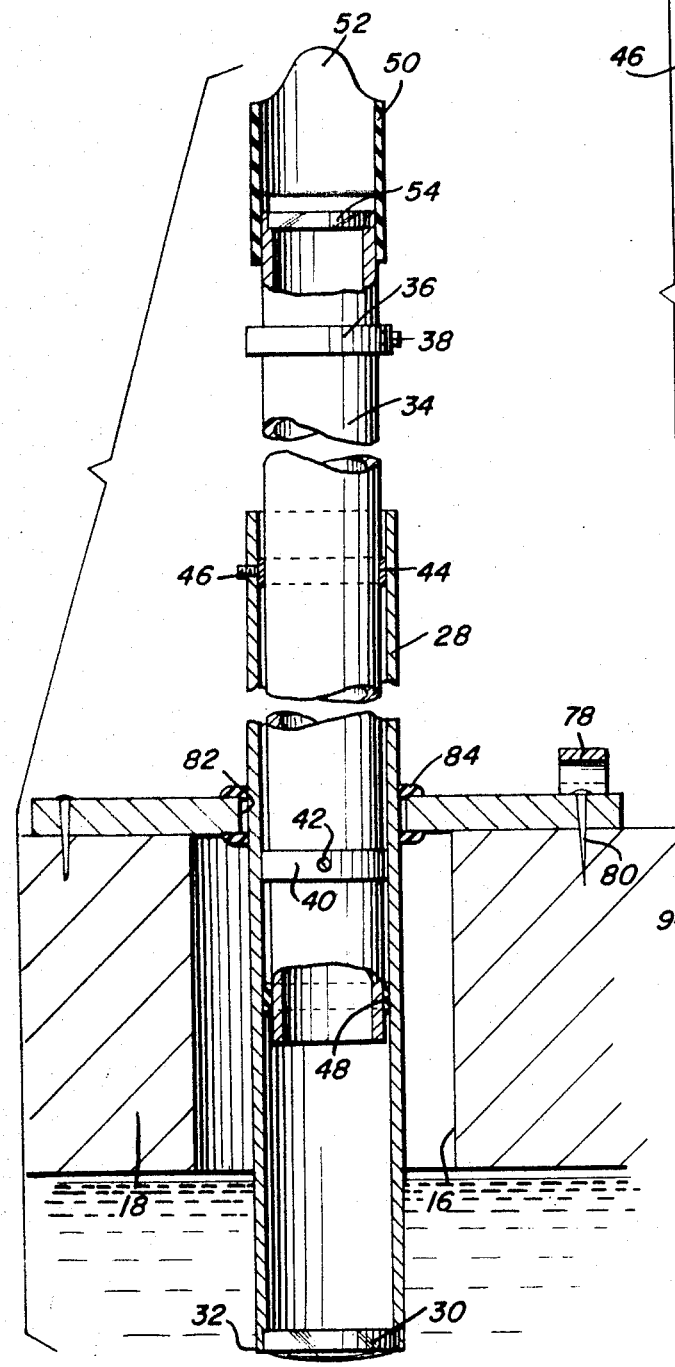
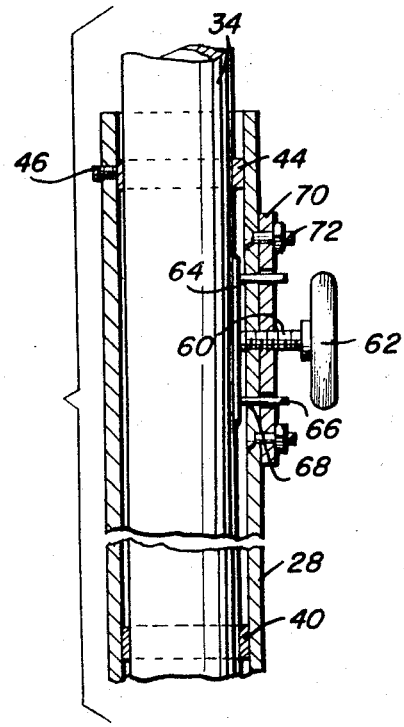
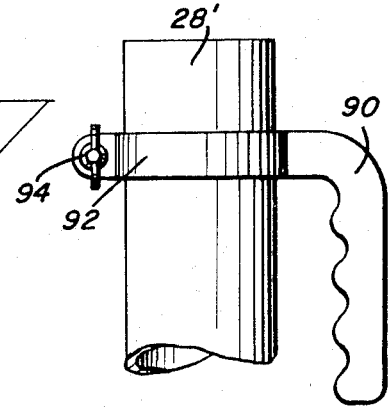
Harold H. England
INVENTOR.
BY *Clarence A. O'Brien*
*and Harvey B. Jacobson*
Attorneys 3,464,137
ICE AUGER HOLE VISUAL FISHING AID
Harold H. England, 14616 88th Ave.,
Edmonton, Alberta, Canada
Filed Apr. 20, 1967, Ser. No. 632,255
Int. Cl. A01k 97/00, 69/00
U.S. Cl. 43—4                                                11 Claims

ABSTRACT OF THE DISCLOSURE

A visual aid for ice hole fishing includes telescopically and adjustably associated opaque tubular members having a transparent window closure at the lower end of one member and a cushioned eye shield at the upper end of the other member. An opaque cover for the ice hole has a central opening provided with a resilient, light-sealing gasket frictionally engaging one of the tubular members. The cover has anchor spikes for engaging the ice and a slit for receiving a fishing line.

---

The present invention generally relates to a visual aid for ice auger hole fishing and is in the form of a viewing device having an opaque tubular member with an optic lens or window at the lower end thereof and a viewing adapter at the other end thereof to enable the fisherman to sit comfortably while employing the visual aid.

In present-day procedures and techniques, most ice fishermen fish through ice auger holes which are usually six inches in diameter. Ice fishermen normally employ one of several methods. The fisherman can jig blindly through an ice hole while sitting in the open air. Jigging blindly (lifting a hook up and down) is not too successful inasmuch as it is impossible to determine the relative position of the fishhook and fish. However, good visual contact with the lake bottom is possible only in the dark and it will be appreciated that fishing in total darkness is a tedious and uncomfortable method. Thus, visual contact with the fish under the ice is usually made by one of two methods in present-day techniques. The fisherman lies down on the ice surface on blankets or the like and covers himself and the ice auger hole in the same way, that is, with a blanket or the like. The covered light-proof ice hole would allow visual contact with the lake bottom in shallow water providing no light is allowed to enter around the covering garments. This procedure is quite uncomfortable, often wet and very cold for the fisherman. In lieu of this procedure, a fisherman may construct a light-proof tent or building to cover an ice hole providing no light is allowed to enter around the tent or building which provides for good visual contact with the light bottom. The bottom of the lake may be seen at shallow depths in absolute darkness providing the fisherman places his face adjacent to the ice hole but it will be appreciated that the construction of a tent or building is costly, time consuming and in the conditions encountered such as high wind or the like, it is difficult to maintain the light-proof qualities of such a tent or building.

Visual aids such as normally employed in open water has not been employed by ice fishermen since they do not perform satisfactorily through an ice auger hole. Generally, open water visual aids are rather cumbersome and bulky and will not enter a six inch auger hole and still leave sufficient space for free movement and manipulation of the fishing line. Most open water visual aids do not have sufficient length to extend above the ice sub-surface to a sufficient extent when the ice is several feet thick to enable the ice fishermen to sit in comfort. More importantly, none of the open water visual aids are designed to exclude light from entering the auger hole which renders the device completely useless insofar as ice auger hole fishing is concerned. All light received by the lens of an ice fishing visual aid must come from the subsurface of the ice and water inasmuch as nothing useful can be seen if any light enters the auger hole from above through the ice auger hole.

In view of the specific problems existent in ice auger hole fishing, it is an object of the present invention to provide a visual fishing aid for ice auger hole fishermen in the form of a rigid opaque tubular visual aid which may be telescoping or non-telescoping, provided with an expanded field of vision, constructed so that it is stable and controllable in the ice fishing hole without interfering with the fishermen's line, constructed to withstand repeated instant and severe changes in temperature, manipulatable by one hand while remaining stable and controllable so that the ice fisherman may have one hand free for manipulating his fishing line and constructed so that the objective window or lens will not fog, freeze or break with radical changes in temperature.

Still another object of the present invention is to provide a visual aid for ice auger hole fishing which can be used in the open light inasmuch as it includes an ice auger hole cover which is associated with the opaque tubular member in such a manner to exclude all light from entering the ice auger hole with there being provided a light-proof friction gasket through which the visual aid passes where it extends through the ice auger hole cover with the gasket stabilizing the visual aid and neutralizing the buoyant effect of the water by frictionally engaging the tubular member. The ice auger hole cover is provided with anchoring spikes and is slotted to enable a fishing line to slide into position so that it may be oriented in the ice of the hole as desired and readily moved up and down or removed quickly when necessary.

Still another object of the present invention is to provide an ice auger hole fishing aid which is simple in construction, easy to use, effective for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the visual aid of the present invention being employed by an ice auger hole fisherman;

FIGURE 2 is a longitudinal, sectional view taken substantially upon a plane passing along section line 2—2 of FIGURE 1, on an enlarged scale, illustrating the structural features of the invention;

FIGURE 3 is a detailed sectional view illustrating the telescopic construction of the visual aid;

FIGURE 4 is a fragmental elevational view illustrating a modified type of handle connected to the visual aid;

FIGURE 5 is a sectional view illustrating another form of telescopic construction for the visual aid; and FIGURE 6 is a sectional view illustrating a lens holder incorporated into the fishing aid.

Referring now specifically to the drawings, the ice auger hole visual fishing aid of the present invention is generally designated by the numeral 10 and in FIGURE 1, the visual aid is illustrated in use by a fisherman 12 sitting comfortably on a folding stool, chair or other support 14 with the visual aid 10 disposed through an ice auger hole 16 in the ice 18 on the upper surface of the water 20 of a lake, pond or the like. The fisherman 12 is employing one hand to support and manipulate the fishing line 22 which also extends through the ice hole 16 with the fishing line 22 having the usual baited hook 24 on the lower end thereof. When ice fishing, the fisherman 12 endeavors to manipulate or jig the hook 24 up and down in a manner to lure and catch a fish 26 such as is disposed adjacent the lake bottom. The visual aid 10 of the present invention enables the fisherman to sit in a comfortable position while enabling him to observe the movement and position of a fish 26 adjacent the lake bottom to enable the fisherman to properly orientate the baited hook 24 in a well-known manner.

The visual fishing aid 10 includes an elongated rigid opaque tubular member 28 of uniform cross-sectional diameter throughout its length which diameter is less than the diameter of the ice fishing hole 16 which is a standard size of ice hole formed by ice fishermen. The tubular member 28 may be constructed of any suitable material but a plastic material is preferred which is of rigid construction and which is lightweight and relatively inexpensive. Mounted in the lower end of the tubular member 28 is an objective window or lens 30 secured thereto by any suitable means such as by bonding the lens or window in a recess 32 formed in the inner surface of the lower end of the tubular member 28.

The upper end of the tubular member 28 is open and telescopically receives a similar rigid and opaque tubular member 34 which has an external diameter slightly less than the internal diameter of the tubular member 24. Disposed on the tubular member 34 adjacent the upper end thereof, there is provided an upper collar 36 secured in adjustable position thereon by a setscrew 38 or the like which limits the inward movement of the tubular member 34 into the tubular member 28 inasmuch as it will abuttingly engage the upper end of the tubular member 28. The lower end portion of the tubular member 34 which is received in the tubular member 28 is provided with a similar collar 40 also secured in adjustable position by a setscrew 42 or the like which limits the outward movement of the tubular member 34 in relation to the tubular member 28 to retain the tubular member in assembled relation. The inner surface of the tubular member 28 is provided with an annular ring 44 secured in position by a setscrew 46 extending through the tubular member 28 which coacts with the ring 40 to limit the outward movement of the tubular member 34 in relation to the tubular member 28. Also, the lower end portion of the tubular member 34 is provided with an annular seal or gasket 48 of resilient material or cushioning material such as normally employed in gaskets such as felt or the like to assist in guiding the tubular member 34 in relation to the tubular member 28 and frictionally restricting free relative movement therebetween but more importantly provide a light seal between the tubular members 34 and 28 thereby preventing any possible entry of light in the space between the tubular member 34 and the tubular member 28.

The upper end of the tubular member 34 is provided with a molded light-proof eye cushion 50 of flexible resilient material such as plastic, rubber or the like and which is shaped with axially projecting edges 52 and which is transversely elongated into generally oval-shaped or rectangular shape for engaging the face of the fisherman in enclosing relation to the eye so that when the face of the fisherman is engaged with the eye cushion or adapter 50, the eye cushion 50 will be light-proof, that is, no light can enter between the face of the fisherman and the eye cushion or adapter 50. The eye cushion or adapter is connected to the tubular member 34 in any suitable manner such as by adhesive bonding or the like. Also disposed in the upper end of the tubular member 34 is a viewing lens or window 54 attached to the upper end of the tubular member 34 in any suitable manner such as by reception in a recess 56 formed in the inner surface of the tubular member 34. The window or lens 54 may be anchored in position permanently or removably secured in place.

For manipulating the visual aid 10, the outer tubular member 28 is provided with a rigid loop-type handle 58 attached thereto so that the other hand of the fisherman 12 may grasp the handle 58 for manipulating the visual aid 10 as illustrated in FIG. 1. Diametrically opposed from the handle 58, the lower and outer tubular member 28 is provided with a screwthreaded clamp screw 60 having a hand wheel or handle 62 attached to the outer end thereof and extending interiorly of the tubular member 28 and being provided with a clamp plate 64 on the inner end thereof which is arcuate and engages the periphery of the inner tubular member 34. The arcuate clamp plate 64 is swivelled on the end of the clamp screw 60 in a known manner and is also provided with a pair of laterally projecting parallel pins 66 in perpendicular relation to the plate 64 on opposite sides of the clamp screw 60 for extending through apertures 68 in the outer tubular member 34 for guiding the lateral movement of the clamping plate 64. An outer mounting plate 70 is attached to the tubular member 28 by fastening bolts 72 and the clamp screw 60 is in screwthreaded engagement with the mounting plate 70 which forms a reinforcement for the tubular member 28 which is necessary if the tubular member 28 is constructed of plastic material. Of course, the guide pin 66 also extends through the mounting plate 70 as illustrated in FIG. 3.

For forming a light-proof closure for the ice hole 16, there is provided an ice hole cover generally in the form of a rectangular plate 76 constructed of wood, plastic, metal or the like. The upper surface of the plate 76 is provided with a loop-type handle 78 rigidly affixed thereto adjacent one edge surface thereof to enable the device to be easily transported. Depending from the lower surface of the rigid plate 76 is a plurality of pointed spikes 80 which extend into the ice 18 for anchoring the plate 76 in overlying relation to the ice hole 16 to form a closure therefor. Centrally disposed in the rigid plate 76 is an opening 82 which receives the visual aid 10 and a sealing gasket 84 is provided between the top and bottom surfaces of the plate 76 and the tubular member 28 as illustrated in FIG. 2. The gaskets 84 frictionally engage the tubular member 28 and may be secured to the plate 76 in any suitable manner such as by bonding or the like. As illustrated, the diameter of the hole 82 is slightly larger than the diameter of the tubular member 28 which enables the visual aid 10 to be rocked laterally as well as moved longitudinally in relation to the plate 76 to enable the range of observation of the bottom of the lake to be increased. The frictional engagement between the gaskets 84 and the tubular member 28 overcome the buoyancy of the water 20 when the lower end of the tubular member 28 is disposed below the surface thereof thereby enabling the visual aid 10 to be manipulated by one hand of the fisherman while the other hand manipulates the fishing line 22.

As illustrated, a slot 86 is provided in the plate 76 leading from the hole 82 to a side edge thereof for enabling passage of the fishing line 22. The outer ends of the slot 82 diverge as at 88 to facilitate insertion of the fishing line 22 into the slot 86 and this enables the fishing line 22 to be moved in the ice auger hole 16 without interference from the visual aid 10 and without interfering with the visual aid 10.

FIGURE 4 illustrates another type of handle 90 which may be considered of L-shaped configuration with the handgrip portion thereof depending generally in parallel relation to the tubular member 28'. The laterally extending portion of the handle 90 is in the form of a split clamp 92 having a bolt and wing-type clamp nut 94 extending through the ears of the free ends thereof for clamping mounting the handle 90 in position on the tubular member 28'. This type of construction is employed with a single rigid tube of nontelescopic construction which is lighter in weight and requires a less rigid handle structure.

FIGURE 5 illustrates another type of telescopic construction including an outer tube 96 and an inner tube 98 telescoped into the outer tube 96. The upper end portion of the tubular member 96 is longitudinally slit as at 100 and externally screwthreaded for receiving an internally screwthreaded nut 102 which may be externally knurled or the like and the threaded inner connection as at 104 between the nut 102 and the externally threaded upper end of the tubular member 96 is tapered in such a manner that when the nut 102 is screwed downwardly, the lugs defined by the longitudinal slots or slits 100 will be collapsed inwardly into clamping and gripping engagement with the inner tubular member 98 thus locking the tubular members 96 and 98 in adjusted position.

FIGURE 6 illustrates a tubular member 106 having an inwardly extending and internally threaded annular flange 108 at the lower end thereof for screwthreadedly receiving an adapter 110 which is externally screwthreaded as at 112 for mounting an objective lens or window removably in the tubular member 106 in which the lens is designated by numeral 114 thereby enabling the objective window or lens to be removed and replaced as desired.

As illustrated in FIGURE 1, the slot 86 in the board 76 is also provided with a gasket to preclude entry of light through the slot. In some instances, it may not be necessary to provide such a gasket depending upon the thickness of the board and the width of the slot in the board. Also, the gasket may be used on either the upper or lower surface thereof or on both of the surfaces thereof. The gasket material may be of any suitable construction such as rubber, plastic, felt or the like which will retain its resiliency and frictional gripping characteristics even during extreme temperature changes.

The molded eye cushion 50 may also be removable for replacement as desired and may be of the type which will encircle both eyes or of the type which will encircle a single eye depending upon the desires of the fisherman. The window 54 is preferably removable and may be constructed of plastic or glass. The gaskets between the outer tube and the inner tube prevent direct contact between the tubes and may be preferably anchored to the outside tube. Also, the lowermost window or lens which may be a wide angle lens is removable and preferably constructed of plastic or glass and may be recessed to prevent breakage or placed in a rubber gasket to cushion the lens against possible damage during normal use of the device.

The visual field of the visual aid may be increased by pivoting the device in the ice hole cover gasket and gently rotating it so as not to interfere with the fishing line. A plano-concave lens or wide angle lens would further increase the visual field is desired. For example, if the visual aid was three inches in diameter or one-half the diameter of the ice hole, the visual field would increase four times in diameter in water six feet deep. Of course, the visual field increases with the depth of water and the fishing depth may be on the order of twelve to fifteen feet.

In using the device, an ice auger hole 16 is drilled which is usually six inches in diameter. The fisherman then places the light-proof ice hole cover board 76 in position over the ice of the hole and tramps it down to engage spikes 80 in the ice surface. The fisherman then inserts the tubular member 28 through the friction gasket 84, lowers the tubular member 28 to a position in alignment with the subsurface of the ice 18 or slightly below the subsurface and then adjusts the tubular member 34 to a comfortable eye level by means of the adjusting knob 62 so that the fisherman may kneel, stand or sit in a comfortable position on a chair or stool as illustrated in FIGURE 1 while fishing. The fishing line 22 and hook is inserted through the side slit 86 and the fisherman controls the motion of the tubular member 28 by holding the handle 58 in one hand while the fishing line 22 is held in the other hand. The visual aid 10 may be gently rocked back and forth so as to not interfere with the fishing line 22 and thus provide an expanded field of vision by means of simple angulation of the tubular member 28 which of course angulates the tubular member 34 at the same time and moves eye piece or eye cushion 50 accordingly angulating the tubular member 28 also angulates the window or lens 30 at the sub-surface of the ice 18. This type of angulation is permitted by the spiked board, the holder therein and the friction gasket 84 associated therewith.

The fisherman places his eye on the light-proof and removable cushion 50 and peers through the removable glass or plastic window 54 which may or may not be in place depending upon snow and temperature conditions. By manipulating the fishing line and hook at the lower end thereof, the fisherman may more expeditiously catch a fish. When a fish is caught, tubular member 28 is removed from the gasket 84 and the line 22 is slipped through the lateral extension of the slit and gasket and to the edge of the spike board so that the line is left in the ice hole as the spike board is removed by employing the handle 78 thereon. Depending upon the length of the tubular member 28, the depth of ice in which the present invention may be employed will be limited. From a practical standpoint, the device may be employed in ice depths of up to three feet or more. The gaskets between the tubular members hold them apart and provide free movements thereof even at extreme variations in temperatures. These gaskets may be arranged in any manner depending on the particular arrangement desired and various types of friction devices may be employed for retaining the telescopic tubular members in adjusted position.

The windows or lens may be removably mounted or permanently bonded in place and the eye cushion is preferably binocular for use of both eyes. However, if only one eye is to be used to peer through the visual aid, the eye cushion may be constructed with an offset arrangement to cover both eyes inasmuch as it is quite uncomfortable to keep one eye closed if it is in the open sunlight. This arrangement is preferred when a small diameter tube is being employed while only a single eye is to be used with the device. With the visual aid of the present invention, ice auger fishermen for the first time will be able to see what he is fishing for in the open light while sitting, kneeling or standing in comfort and eliminating the necessity of fishing in an atmosphere of complete darkness in an awkward to move hut or lightproof tent or lying under blankets on the ice. Heretofore, no ice fishing aid has been employed which was placed in the auger hole because such devices could not be held motionless with one hand because of water buoyancy and because of interference with the fishing line.

The foregoing is considered as illustrative only of the principles of the invention. Further, since numerous modifications, and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An ice auger hole visual fishing aid comprising a rigid opaque tubular member adapted to extend through an ice auger hole, a transparent window forming a closure for the lower end of the tubular member, and means forming a light-proof and adjustable association between the tubular member and ice auger hole to preclude the passage of light down through the ice auger hole thereby enabling a fisherman to peer downwardly through the tubular member to observe under water conditions below the ice.

2. The structure as defined in claim 1 wherein said means includes a rigid board adapted to engage the surface of the ice in covering relation to the ice auger hole, said board having an opening therethrough larger than the tubular member, gasket means interconnecting the tubular member and the board to form a light seal and to frictionally and yieldably support the tubular member from the board to enable longitudinal movement of the tubular member therethrough and to enable rocking and tilting movement of the tubular member in relation thereto for enabling increase of the visual range.

3. The structure as defined in claim 2 wherein said board includes a lateral slot extending from one edge thereof to the central aperture for receiving a fishing line passing through the ice auger hole alongside of the tubular member.

4. An ice auger hole visual fishing aid comprising a rigid opaque tubular member adapted to extend through an ice auger hole, a transparent window forming a closure for the lower end of the tubular member, and means forming a light-proof association between the tubular member and ice auger hole to preclude the passage of light down through the ice auger hole thereby enabling a fisherman to peer downwardly through the tubular member to observe under water conditions below the ice, said means including a rigid board adapted to engage the surface of the ice in covering relation to the ice auger hole, said board having an opening therethrough larger than the tubular member, gasket means interconnecting the tubular member and the board to form a light seal and to frictionally and yieldably support the tubular member from the board to enable longitudinal movement of the tubular member therethrough and to enable rocking and tilting movement of the tubular member in relation thereto for enabling increase of the visual range, said board including a lateral slot extending from one edge thereof to the opening for receiving a fishing line passing through the ice auger hole alongside of the tubular member, said board including depending pointed spikes for driving into the surface of the ice and anchoring the board in position when a fisherman places his feet on the board for retaining the board in place, said board including handle means attached thereto for enabling manipulation thereof.

5. The structure as defined in claim 4 wherein said tubular member includes an upper tubular member telescoped into a lower tubular member, said upper tubular member including a transparent window closure member at the upper end thereof, an eye cushion member attached to the upper end of the upper tubular member for engaging the surface of the face of a fisherman employing the visual aid in a manner to exclude light from the tubular members, and means securing the tubular members in adjusted position.

6. The structure as defined in claim 5 wherein said securing means includes a clamp plate movably mounted in the outer tubular member, a clamp screw engaged with the clamp plate for moving the clamp plate inwardly and outwardly into clamped and unclamped relation to the upper tubular member, and a knob for operating said clamp screw.

7. The structure as defined in claim 5 wherein said securing means includes a plurality of longitudinal slits formed in the end of the tubular member receiving the upper tubular member, and a threaded tapered clamping collar engaged with the slotted portion of the outer tubular member for collapsing the slotted portion into clamping engagement with the upper tubular member.

8. A subaqueous visual aid for allowing an ice auger hole fisherman to fish in comfort in the open light and allow him to obtain a view of the area below his ice auger hole comprising a substantially rigid opaque tube of substantially uniform cross-sectional area throughout its length for positioning through an ice hole and extending above the ice surface to a comfortable level thereby enabling a fisherman to peer through the tube from the upper end thereof, a substantially rigid, opaque closure cover for the ice hole, said cover having an opening therein receiving said tube and means disposed peripherally of the opening to frictionally support said tube for longitudinal movement and lateral rocking movement while excluding passage of light between the closure cover and said tube.

9. The structure as defined in claim 8 wherein the lower end portion of said tube includes a transparent objective window forming a watertight closure for the tube, a transparent viewing window in the upper end portion of said tube and forming a closure for the tube, and an eye cushion on the upper end portion of said tube to engage the face of a fisherman peripherally of the eyes to exclude light from entering the upper end of the tube.

10. The structure as defined in claim 8 wherein said cover is in the form of a rigid panel having depending projections thereon for anchoring engagement with the ice surface.

11. The structure as defined in claim 8 wherein said cover includes a radial slot therein for receiving a fishing line passing through the ice hole.

References Cited

UNITED STATES PATENTS

| | | | |
|---|---|---|---|
| 678,467 | 7/1901 | Groomes | 350—91 |
| 1,137,192 | 4/1915 | Ferber | 350—85 X |
| 1,451,096 | 4/1923 | Hagen | 350—91 |
| 1,785,027 | 12/1930 | Gephart | 43—22 |
| 2,746,194 | 5/1956 | Lonnman | 43—1 |
| 2,778,139 | 1/1957 | Furnari | 43—6 |
| 2,968,208 | 1/1961 | Shaw | 350—91 |
| 3,134,188 | 5/1964 | Petersen | 43—17 |

WARNER H. CAMP, Primary Examiner

U.S. Cl. X.R.

350—82